UNITED STATES PATENT OFFICE.

HENRY GROGAN, OF FLATBUSH, NEW YORK.

IMPROVEMENT IN LUBRICATING COMPOUNDS.

Specification forming part of Letters Patent No. 106,053, dated August 2, 1870; reissue No. 4,440, dated June 27, 1871.

*To all whom it may concern:*

Be it known that I, HENRY GROGAN, of Flatbush, in the county of Kings and State of New York, have invented a new and useful Improvement in Lubricating Compound; and I do hereby declare the following to be a full, clear, and exact description thereof, which will enable those skilled in the art to make and use the same.

This invention relates to a compound of tallow, petroleum, and caustic soda, which ingredients are mixed together to a pasty mass, with which is also mixed a quantity of animal hair in such a manner that, on applying the compound to a journal, the hairs are drawn out endwise by the action of the journal, and that said hairs by their capillary attraction carry a sufficient supply of the lubricating material to the journal to keep the same in order for a long time without requiring any attention.

In preparing my compound I take the above-named ingredients in about the following proportions: Tallow, one part; petroleum, (by preference the heavy oil,) three to six parts; caustic soda, (dissolved in water to 10° Baumé,) one part. These ingredients are cooked together until they are completely melted and the water from the soda is entirely evaporated; but, during the operation of cooking, the mass should be stirred to prevent burning. After the ingredients have thus been intimately mixed the mass is removed into another tank and permitted to cool. After the said mass has cooled I introduce a quantity of animal hair, more or less, according to the journals for which the lubricating compound is to be used—about one part of hair being used to from eight to ten parts of the mass, prepared as above described.

My compound, when finished, forms a pasty mass, and if it is applied to a journal the hairs mixed with it are immediately drawn out, so that the same will act in the capacity of small tubes, conducting the lubricating material to the journal; and, furthermore, the hair is not liable to heat or to enter into a combustible combination like cotton-waste, and I am enabled to fill up the lubricating-compartment of an axle-box, for instance, and the journal will run for a long time without requiring the least attention and without wasting any of the lubricating material.

What I claim as new, and desire to secure by Letters Patent, is—

1. The combination of caustic soda, tallow, and petroleum, or their respective chemical equivalents, in about the proportion set forth, treated and compounded substantially in the manner described.

2. Combining with the compound thus produced, or its chemical equivalent, animal hair in about the proportion and for the purpose specified.

This specification signed by me this 12th day of June, 1871.

HENRY GROGAN.

Witnesses:
W. HAUFF,
E. F. KASTENHUBER.